US010743972B2

(12) United States Patent
Greer, Jr.

(10) Patent No.: US 10,743,972 B2
(45) Date of Patent: Aug. 18, 2020

(54) HIDDEN USER INTERFACE PANEL FOR PERSONAL CARE APPLIANCES AND METHOD OF MAKING SAME

(71) Applicant: KONINKLIJKE PHILIPS N.V., Eindhoven (NL)

(72) Inventor: Lester Ronald Greer, Jr., Edmonds, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 111 days.

(21) Appl. No.: 16/072,731

(22) PCT Filed: Jan. 25, 2017

(86) PCT No.: PCT/EP2017/051489
§ 371 (c)(1),
(2) Date: Jul. 25, 2018

(87) PCT Pub. No.: WO2017/129587
PCT Pub. Date: Aug. 3, 2017

(65) Prior Publication Data
US 2019/0008620 A1    Jan. 10, 2019

Related U.S. Application Data

(60) Provisional application No. 62/350,872, filed on Jun. 16, 2016, provisional application No. 62/287,166, filed on Jan. 26, 2016.

(51) Int. Cl.
*A61C 17/22*    (2006.01)
*F21V 33/00*    (2006.01)
(Continued)

(52) U.S. Cl.
CPC .......... *A61C 17/225* (2013.01); *A61C 17/221* (2013.01); *F21V 33/004* (2013.01);
(Continued)

(58) Field of Classification Search
CPC ... A61C 17/225; A61C 17/221; F21V 33/004; G09F 9/302; G09F 13/04; G09F 13/0413;
(Continued)

(56) References Cited

U.S. PATENT DOCUMENTS 4,506,956 A * 3/1985 Dir .................. G02F 1/1335
349/106
5,477,024 A * 12/1995 Share ................ H01H 9/182
219/121.69
(Continued)

FOREIGN PATENT DOCUMENTS

DE    202011051686 U1    1/2012
WO    2012056374 A1    5/2012

*Primary Examiner* — Dung Van Nguyen

(57) ABSTRACT

An oral cleaning device comprising a handle portion (12) with a plurality of indicia (15) and a plurality of illuminating elements (31); and a user interface assembly (24), the user interface assembly including an interface panel (26) and a baffle assembly (30), the baffle assembly including a plurality of baffle sections (49) each corresponding with a respective one of the plurality of illuminating elements and a respective one of the plurality of indicia, and further where each of the plurality of baffle sections including a cover portion (49a) covering the baffle section and positioned between the respective one of the plurality of illuminating elements and the respective one of the plurality of indicia. The user interface assembly is structured to be blank when the device is powered off, and to illuminate one of the indicia when the device is powered on.

15 Claims, 5 Drawing Sheets

(51) Int. Cl.
  *G09F 13/04* (2006.01)
  *G09F 13/08* (2006.01)
  *G09F 9/302* (2006.01)
  *F21Y 115/10* (2016.01)
  *H01L 25/075* (2006.01)

(52) U.S. Cl.
  CPC .............. *G09F 9/302* (2013.01); *G09F 13/04* (2013.01); *G09F 13/0413* (2013.01); *G09F 13/08* (2013.01); *F21Y 2115/10* (2016.08); *H01L 25/0753* (2013.01)

(58) Field of Classification Search
  CPC ... G09F 13/08; F21Y 2115/10; H01L 25/0753
  See application file for complete search history.

(56) References Cited

U.S. PATENT DOCUMENTS

| | | | | |
|---|---|---|---|---|
| 5,579,035 | A | * | 11/1996 | Beiswenger ........ G02F 1/13338 345/169 |
| 9,021,646 | B2 | | 5/2015 | Nazaroff et al. |
| 2002/0092104 | A1 | * | 7/2002 | Ferber .................. A61C 17/224 15/22.1 |
| 2005/0195614 | A1 | * | 9/2005 | Bayersdorfer ...... F16H 59/0278 362/545 |
| 2007/0188456 | A1 | * | 8/2007 | Shaft ................... G06F 3/03543 345/163 |
| 2010/0024143 | A1 | | 2/2010 | Dickie |
| 2010/0061048 | A1 | * | 3/2010 | Mills ....................... G04G 9/00 361/679.21 |
| 2013/0314900 | A1 | | 11/2013 | Timmerman et al. |

\* cited by examiner

HIDDEN USER INTERFACE PANEL FOR PERSONAL CARE APPLIANCES AND METHOD OF MAKING SAME

CROSS-REFERENCE TO PRIOR APPLICATIONS

This application is the U.S. National Phase application under 35 U.S.C. § 371 of International Application No. PCT/EP2017/051489, filed on Jan. 25, 2017, which claims the benefit of U.S. Provisional Patent Application No. 62/350,872, filed on Jun. 16, 2016 and U.S. Provisional Patent Application No. 62/287,166, filed on Jan. 26, 2016. These applications are hereby incorporated by reference herein.

FIELD OF THE INVENTION

The present disclosure is directed generally to methods and systems for providing, to a user of an oral cleaning device, an improved user interface panel.

BACKGROUND

Power toothbrushes and other personal care appliances typically include a user interface panel which provides for user control of, and associated indications of, various operating modes of the appliance. For example, a power toothbrush can include several different cleaning modes involving different brushhead speeds and/or amplitudes, and further could have various sequences of different modes for a set brushing time, e.g. two minutes. A control button or other user interface is usually provided for selecting a particular mode, and the panel indication of the selected mode is typically illuminated or otherwise highlighted to provide a clear indication to the user of the mode in which the toothbrush is operating. This allows the user to quickly see in which mode the device is currently operating, and provides the user with the ability to quickly change from one mode to another mode.

Some appliances comprise a hidden interface panel, also referred to as a dead panel. With such panels, when the appliance is off, the panel is completely blank. When the appliance is on, the panel is visible with the one or more mode indications. Although this adds to the attractiveness of the appliance, hidden panels are structurally complex and require a number of different parts. As result, hidden panels are more expensive and time-consuming to manufacture. Additionally, when a hidden panel is painted or colored and subsequently illuminated with light during use, the light can produce hot spots where the center of the light is brighter than the outside edges of the light. This bleed-through or hot spot illumination detracts from the utility and visual appeal of the panel.

Accordingly, there is a continued need in the art for methods and devices with hidden panels that are affordable and less time-consuming to manufacture, and avoid bleed-through or hot spot illumination.

SUMMARY OF THE INVENTION

The present disclosure is directed to inventive methods and devices for an oral cleaning device with a hidden panel without bleed-through or hot spot illumination. The oral cleaning device includes a user interface assembly with an interface panel. The user interface assembly is structured so that when the oral cleaning device is off, the interface panel is blank, and when the oral cleaning device is on, a visual indicator on the panel corresponding to a selected mode is illuminated and visible to the user. At least a portion of the body is translucent and includes a plurality of illuminating elements mounted within individual baffle sections of a baffle assembly therein, the baffle assembly constructed such that an illuminating element within one baffle section will only illuminate the indicia in front of that baffle section, and light from that illuminating element will not illuminate or partially illuminate indicia in any other baffle sections. To avoid bleed-through or hot spot illumination, the baffle includes a thin film of material that disperses the light evenly through the housing.

Generally in one aspect, an oral cleaning device is provided. The oral cleaning device includes: a handle portion comprising a plurality of indicia and a plurality of illuminating elements; and a user interface assembly, the user interface assembly comprising an interface panel and a baffle assembly, the baffle assembly comprising a plurality of baffle sections wherein each of the plurality of baffle sections corresponds with a respective one of the plurality of illuminating elements and a respective one of the plurality of indicia, and further wherein each of the plurality of baffle sections comprises a cover portion covering the baffle section and positioned between the respective one of the plurality of illuminating elements and the respective one of the plurality of indicia; wherein the user interface assembly is configured such that when the oral cleaning device is powered off the interface panel is blank, and when the oral cleaning device is powered on, at least one of the plurality of indicia on the panel corresponding to a selected oral cleaning device mode is illuminated.

According to an embodiment, the cover portion is a thin film or a thermoplastic elastomer (TPE).

According to an embodiment, the handle portion adjacent the user interface assembly is translucent.

According to an embodiment, the interface panel comprises: a masking layer formed on an outer surface of the handle portion, the masking layer comprising one or more etched regions defining the plurality of indicia; and a light transmitting layer formed on the masking layer and etched regions. According to an embodiment, the interface panel further comprises a protective layer formed on the light transmitting layer.

According to an embodiment each of the plurality of illuminating elements comprises a plurality of intensities. According to an embodiment, the plurality of illuminating elements are LEDs.

According to an aspect is an oral cleaning device. The oral cleaning device includes: a handle portion comprising a plurality of indicia and a plurality of illuminating elements; a brush head member positioned at one end of the handle portion; a mode select member; and a user interface assembly, the user interface assembly comprising an interface panel and a baffle assembly, the baffle assembly comprising a plurality of baffle sections wherein each of the plurality of baffle sections corresponds with a respective one of the plurality of illuminating elements and a respective one of the plurality of indicia, and further wherein each of the plurality of baffle sections comprises a cover portion covering the baffle section and positioned between the respective one of the plurality of illuminating elements and the respective one of the plurality of indicia; wherein the interface panel comprises: (i) a masking layer formed on an outer surface of the handle portion, the masking layer comprising one or more etched regions defining the plurality of indicia, and (ii) a light transmitting layer formed on the masking layer and etched regions; wherein the handle portion adjacent the user interface assembly is translucent, and further wherein the user interface assembly is configured such that when the oral cleaning device is powered off the interface panel is blank, and when the oral cleaning device is powered on, at least one of the plurality of indicia on the panel corresponding to a selected oral cleaning device mode is illuminated.

According to an aspect is a method for manufacturing an interface panel of an oral cleaning device. The method includes the steps of: inserting a baffle assembly inside a handle portion of the oral cleaning device, the handle portion comprising a plurality of indicia and a plurality of illuminating elements, the baffle assembly comprising a plurality of baffle sections, each of the plurality of baffle sections comprising a cover portion covering the baffle section and positioned between the respective one of the plurality of illuminating elements and the respective one of the plurality of indicia; applying a masking layer on an outer surface of the handle portion; etching at least a portion of the masking layer to create one or more etched regions defining the plurality of indicia; and applying a light transmitting layer over the masking layer and etched regions.

According to an embodiment, the method further includes the step of applying a protective layer on top of the second layer It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a method and device for an evenly illuminated hidden panel. More generally, Applicant has recognized and appreciated that it would be beneficial to provide a system to prevent bleed-through or hot spot illumination in a hidden panel. Accordingly, the methods described or otherwise envisioned herein provide an oral cleaning device configured with a hidden panel having a baffle assembly, the baffle assembly including a thin film of material that disperses the light evenly through the housing.

A particular goal of utilization of the embodiments and implementations herein is to provide brushing information and feedback using an oral cleaning device such as, e.g., a Philips Sonicare™ toothbrush (manufactured by Koninklijke Philips Electronics, N.V.).

Figure 1:
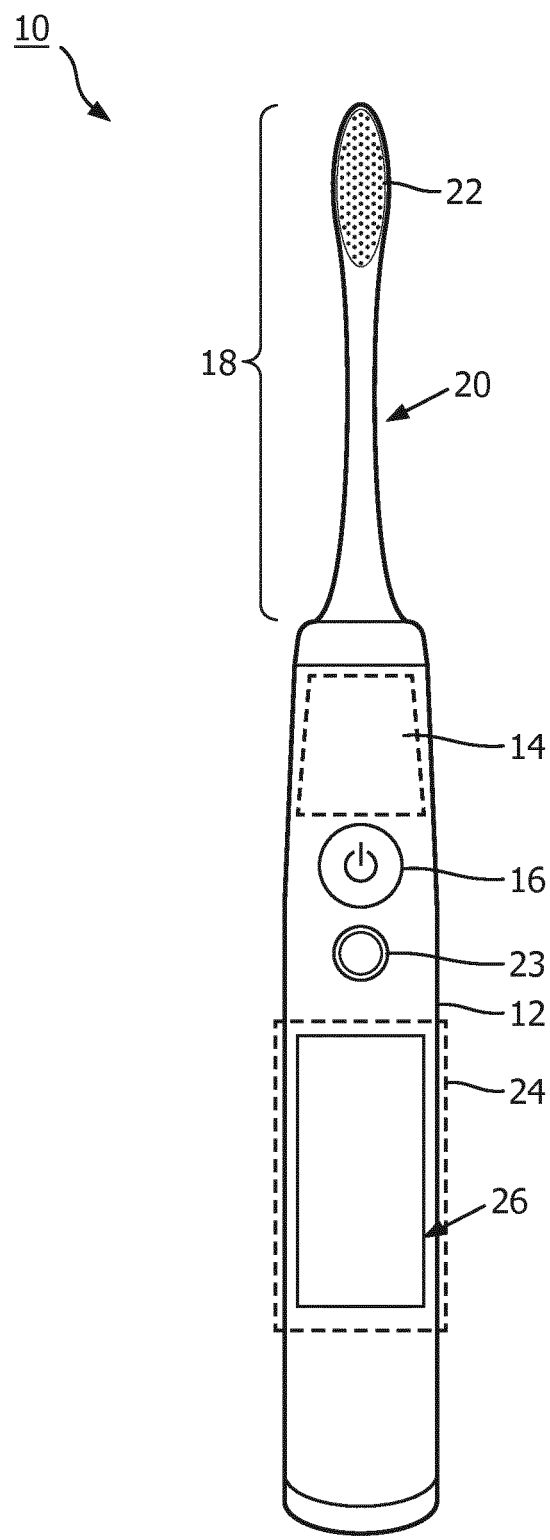
FIG. 1 is a schematic representation of an oral cleaning device, in accordance with an embodiment.

Referring to FIG. 1, in one embodiment, an oral cleaning device 10 is provided that includes a handle portion 12 and a brush head member 18 mounted on the handle portion. Brush head member 18 includes a neck portion 20 with a set of bristles 22 at its end remote from the handle portion. According to an embodiment, the bristles extend along an axis substantially perpendicular to the head's axis of elongation, although many other embodiments of the brush head and bristles are possible.

According to an embodiment, bristles 22 and/or a portion or the entirety of brush head member 18 are mounted so as to be able to move relative to the handle portion 12. The movement can be any of a variety of different movements, including vibrations or rotation, among others. According to one embodiment, head member 18 is mounted to the body so as to be able to vibrate relative to handle portion 12, or, as another example, the brush head is mounted to head member 18 so as to be able to vibrate relative to handle portion 12. The head member 18 can be fixedly mounted onto handle portion 12, or it may alternatively be detachably mounted so that head member 18 can be replaced with a new one when the bristles or another component of the device are worn out and require replacement.

According to an embodiment, handle portion 12 includes an electrically powered drive assembly and a transmission component 14 for generating movement and transmitting the generated movements to brush head member 18, causing the brush head member 18 and/or bristles 22 to vibrate in an oscillatory pattern. The drive assembly can comprise a motor or electromagnet(s) that generates movement of the transmission component, which is subsequently transmitted to the brush head member 18. The drive assembly can include components such as a power supply, an oscillator, and one or more electromagnets, among other components. In one embodiment the power supply comprises one or more rechargeable batteries which can, for example, be electrically charged in a charging holder in which oral cleaning device 10 is placed when not in use.

Figures 2A, 2B:
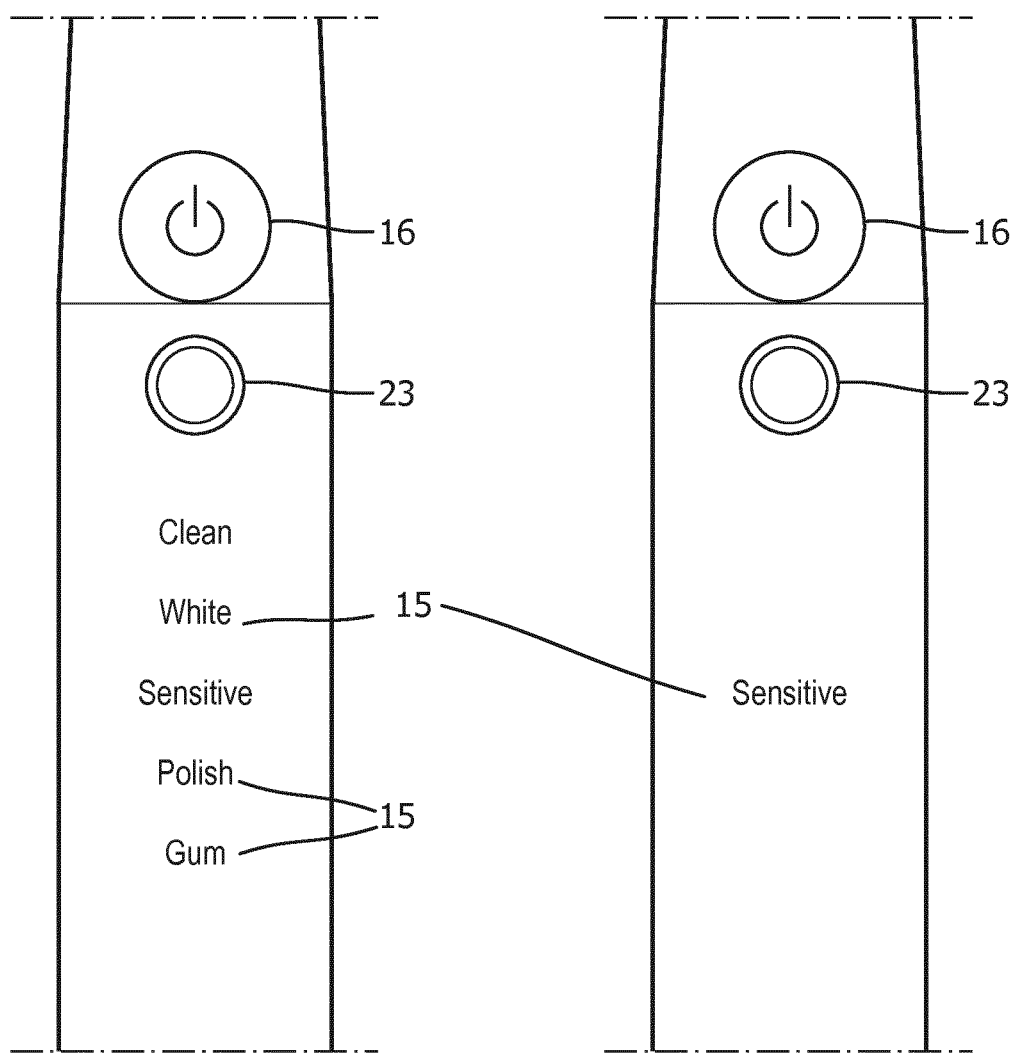
FIG. 2A is a schematic representation of an interface panel of an oral cleaning device, in accordance with an embodiment.
FIG. 2B is a schematic representation of an interface panel of an oral cleaning device, in accordance with an embodiment.

Handle portion 12 is further provided with an on/off button 16 to activate and de-activate the drive assembly. According to an embodiment, handle portion 12 includes a user interface assembly 24, which includes a user interface panel 26. Although shown in the handle portion 12 in FIGS. 1-2, the user interface panel 26 can be located anywhere on the oral cleaning device. The user interface panel 26 is hidden or dead when the appliance is off, as shown in FIG. 1. However, the user interface panel 26 is capable of illuminating several different informational indicia, such as shown in FIG. 2A with, for example, modes "Clean," "White," "Sensitive," "Polish," and "Gum." The user interface panel 26 is illuminated with the particular selected mode of operation when the appliance is on, as shown in FIG. 2B in which "Sensitive" is selected. To select among the different modes of operation, the interface assembly includes a mode select element. According to an embodiment, the on/off switch 16 and mode select element can be incorporated into a single element serving both purposes, or the mode select element can be a separate element 23, such as shown in FIG. 1.

The user interface assembly 24 and the interface panel 26 of an oral cleaning device can take many different configurations. For a toothbrush, for example, the interface assembly and the panel will comprise one or more indications representing a series of cleaning modes or other oral care modes, such as particular combinations of frequency and amplitude of the brush member action. The individual indications or indicia 15 can be in the form of words, symbols, icons, or a combination thereof. In FIG. 2A, for example, the interface panel 26 is shown with all the different modes shown illuminated. This particular configuration may occur, for example, when the device is first turned on to let the user know all possible operating mode selections available. Alternatively, in some arrangements of the device, only the selected mode may be illuminated, without first illuminating all different modes upon device activation.

Figure 3:
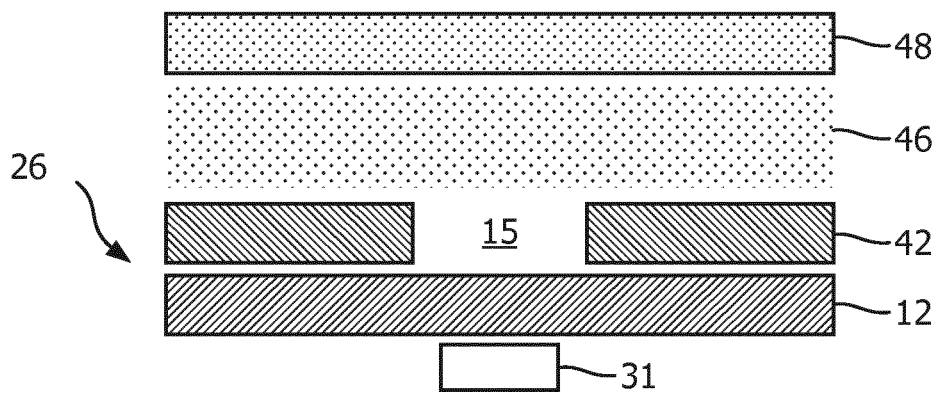
FIG. 3 is a schematic representation of a cross-section of an interface panel of an oral cleaning device, in accordance with an embodiment.

Referring to FIG. 3, in one embodiment, is a cross-section of a user interface panel 26 of an oral cleaning device 10, including a portion of the handle portion 12 of the device, and an LED 31 of the device. According to this embodiment, this portion of the handle portion 12 of the device is translucent or transparent and permits light from LED 31, which is located inside the handle portion, to illuminate there-through. LED 31 may be one or a plurality of LEDs, and may be a single color or a plurality of colors. According to an embodiment, each indicia 15 is illuminated by a separate LED 31, which is bright enough to illuminate the indicia for the user. The LEDs can be white, but can also be one or more other colors. It can be appreciated that the LEDs 31 can also have more than one level of brightness.

According to an embodiment, the user interface assembly 24 comprises a first layer of paint 42, which is first applied to the handle portion 12 of the device. The paint is typically gray, black, or another color that blocks light from the LEDs or other illuminating elements in the handle. This first layer 42 is also known as a masking layer. According to an embodiment, in a next step of the method of manufacturing the user interface assembly 24, the desired mode indicia 15 for the panel are etched in the first paint layer 42. The etching can be performed by a laser, although other means could be used. The etching extends to the surface of the handle 12, such that light can proceed through etched areas of the indicia 15 from an illuminating element 31, as shown in FIG. 3.

According to an embodiment, the user interface assembly 24 comprises a second paint layer 46 applied over at least the areas that have been etched 15. For example, the second paint layer 46 can be white, such that an illuminated mode indicia 15 appears white. Layer 46 is typically a single layer, although multiple layers could be used. Paint layer 46 is configured to avoid a pigment that would block too much light, as it is desirable that the illumination be sufficient to make the indicia 15 readily visible. White paint is preferred, but other light colors, such as light pink, yellow or even silver could be used.

According to an embodiment, the user interface assembly 24 comprises a third layer such as a clear coat layer 48 of polyurethane or similar material. Layer 48 can, for example, protect the user interface assembly 24 from wear during use of the oral cleaning device. Accordingly, in this embodiment, the user interface assembly 24 comprises a base layer 42 of light-blocking paint which is etched with the desired mode indicia 15, a second layer 46 of paint which provides the desired color for the indicia, and a final protective coat 48. Many other configurations are possible.

Figure 4:
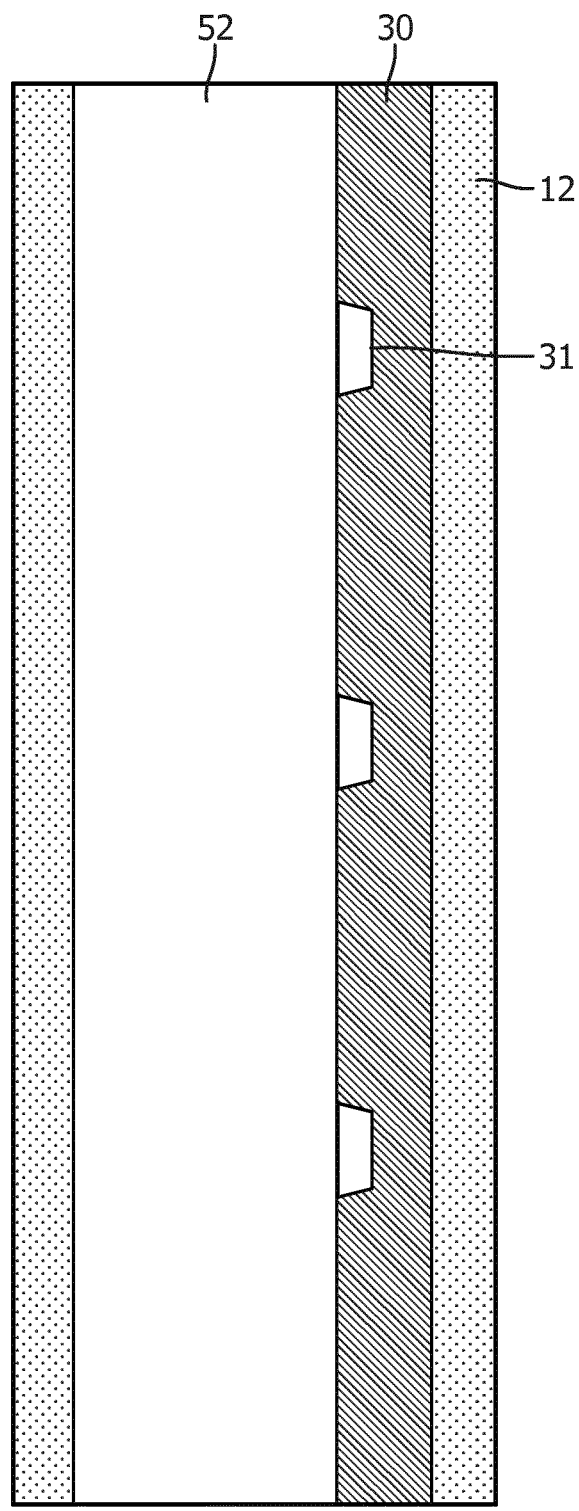
FIG. 4 is a schematic representation of a cutaway side view of the handle portion of an oral cleaning device, in accordance with an embodiment.

According to an embodiment, the user interface assembly 24 comprises baffle assembly 30 which surrounds the LEDs 31 for the purpose of containing the light produced by each LED to its specific associated front panel indicia 15 so that only a single indicia, that which is selected, will be illuminated. Referring to FIG. 4, in one embodiment, is a cutaway side view of the handle portion 12 of an oral cleaning device. The handle portion 12 comprises a central portion that houses the components of the device such a battery, the drive assembly 14, and other components. The handle portion 12 also comprises a baffle assembly 30 and LEDs 31.

Figures 5A, 5B:
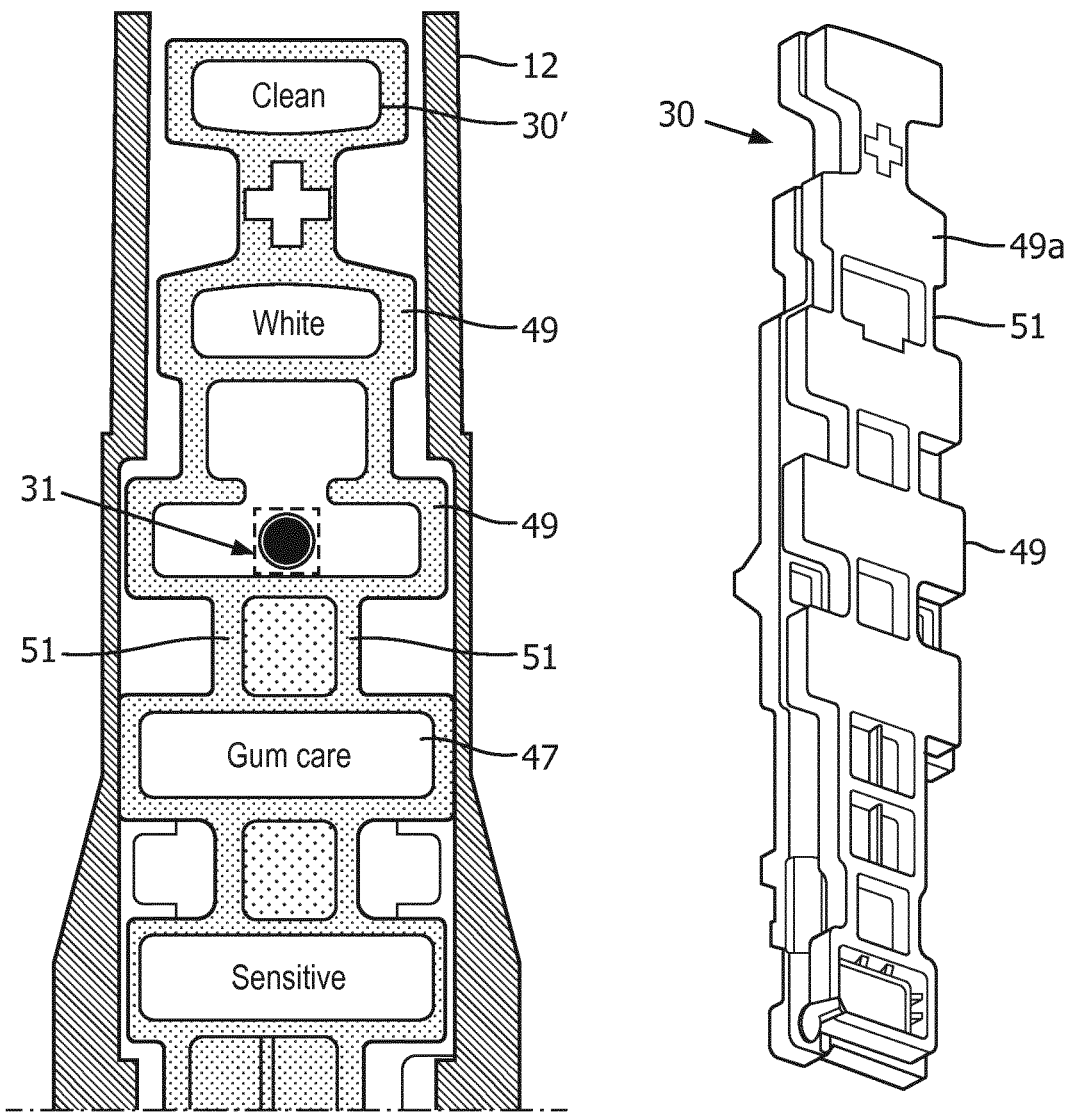
FIG. 5A is a schematic representation of a prior art baffle structure for an oral cleaning device.
FIG. 5B is a schematic representation of a baffle structure for an oral cleaning device, in accordance with an embodiment.

Referring to FIG. 5A is a prior art baffle assembly 30' which would be positioned inside handle portion 12 adjacent to the inside surface of the handle. The baffle assembly 30' comprises individual baffle sections 49 encircling an associated LED 31, each baffle section 49 being connected to adjacent sections by connecting portions 51. In this illustration only a single LED 31 is shown, without the overlying indicia 15. However, it can be appreciate that there is typically an LED 31 behind each individual baffle section 49. The baffle assembly 30' comprises openings 47 in each baffle section 49 through which light from LED 31 can be emitted through the opening 47 and project out through the indicia 15 etched in the paint on the handle portion 12. However, these openings 47 are structured such that the light from the LED 31 also projects beyond the specific opening 49, and there is bleed through such that indicia in one or more adjacent openings 49 can also be illuminated or partially illuminated, leading to confusion on the part of the user as to which mode is actually selected.

Referring to FIG. 5B, in one embodiment, is a baffle assembly of the present invention. The baffle assembly 30 comprises individual baffle sections 49 connected to adjacent sections by connecting portions 51. In contrast to baffle assembly 30' in FIG. 5A, however, baffle assembly 30 does not comprise openings 47. Instead, each baffle section 49 of baffle assembly 30 comprises a cover layer 49a. Cover layer 49a is composed of a material that allows light from LED 31 to pass through, but prevents diffusion of the light to adjacent baffle sections. Accordingly, cover layer 49a may be, for example, a very thin layer of a plastic material or a film. The cover layer 49a may be, for example, a light color. For example, the cover layer 49a may be a thermoplastic elastomer (TPE), or other thin and/or light polymer. In contrast, the walls of the baffle sections 49 and the connecting portions 51 are composed of a material that prevents light diffusion.

Figure 6:
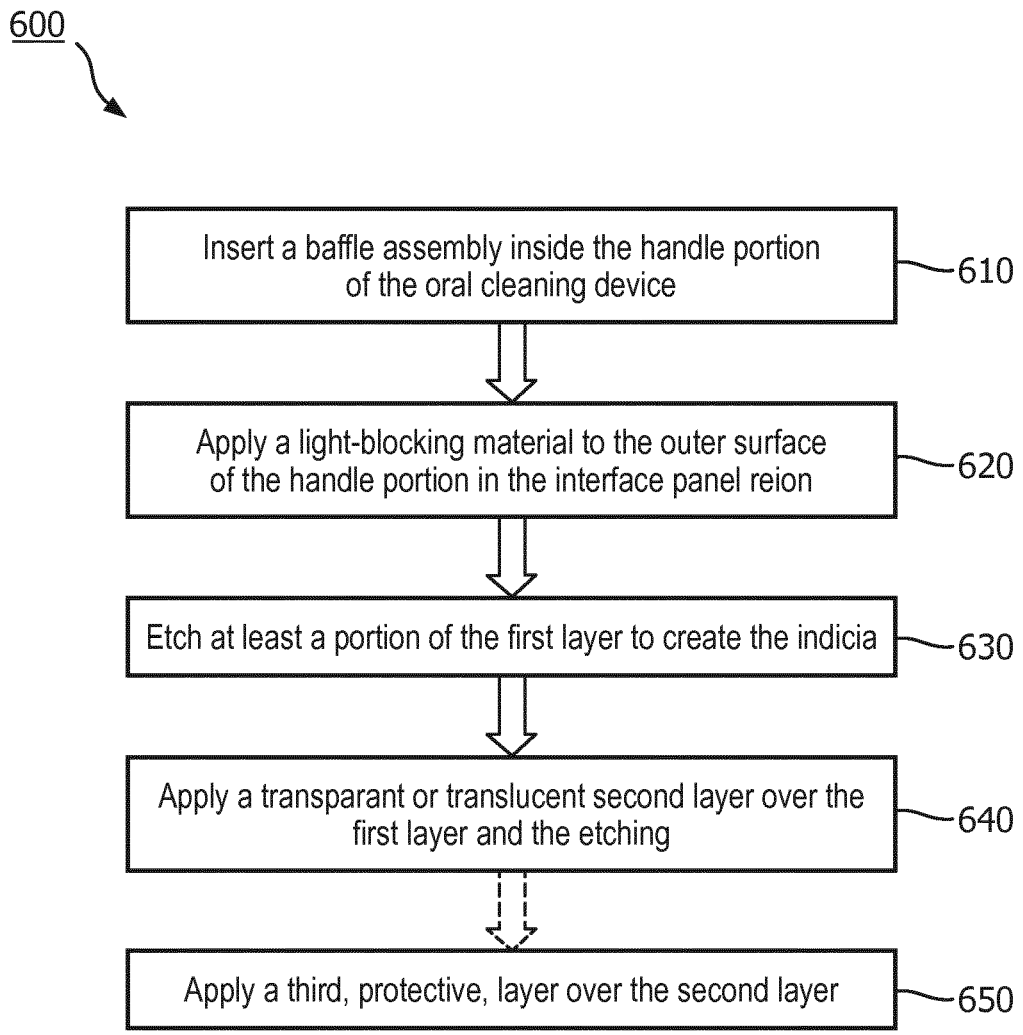
FIG. 6 is a flowchart of a method for manufacturing an oral cleaning device, in accordance with an embodiment.

Referring to FIG. 6, in one embodiment, is a flowchart of a method 600 for manufacturing an oral cleaning device 10. The oral cleaning device can be any of the devices described or otherwise envisioned herein.

In step 610 of the method, a baffle assembly is inserted inside a handle portion 12 of the oral cleaning device. The baffle assembly 30 comprises a plurality of baffle sections 49 each connected to an adjacent baffle section 49 by a connecting portion 51, each baffle section comprising a cover portion 49a that covers the baffle section and is adjacent to an inside surface of the handle portion 12. Each baffle portion comprises or covers at least one illuminating element 31 therein.

In step 620 of the method, a first layer 42 is applied to the outer surface of the handle portion 12 in the user interface panel 24 region. The first layer is a light-blocking material, such as a paint material. In step 630 of the method, a portion of the first layer 42 is etched down to the handle portion 12 to create etching for indicia 15.

In step 640 of the method, a second layer 46 is applied to the outer surface of the handle portion 12 on top of the first layer 42 and the etching 15. The second layer 46 is a light-transmitting material, and is translucent or transparent.

In optional step 650 of the method, a third layer 48 is applied to the outer surface of the handle portion 12 on top of the second layer 46. The third layer can be polyurethane or similar material, for example. Layer 48 can, for example, protect the user interface assembly 24 from wear during use of the oral cleaning device. Accordingly, in this embodiment, the user interface panel 26 of the user interface assembly 24 comprises a base layer 42 of light-blocking paint which is etched with the desired mode indicia 15, a second layer 46 of paint which provides the desired color for the indicia, and a final protective coat 48. Many other configurations are possible.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of,"

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. An oral cleaning device comprising:
a handle portion comprising a plurality of indicia and a plurality of illuminating elements; and
a user interface assembly, the user interface assembly comprising an interface panel and a baffle assembly, the baffle assembly comprising a plurality of baffle sections wherein each of the plurality of baffle sections corresponds with a respective one of the plurality of illuminating elements and a respective one of the plurality of indicia, and further wherein each of the plurality of baffle sections comprises a cover portion covering the baffle section and positioned between the respective one of the plurality of illuminating elements and the respective one of the plurality of indicia, and further wherein the cover portion comprises a material that allows light from the respective one of the plurality of illuminating elements to pass through and prevents diffusion of the light to adjacent baffle sections;
wherein the user interface assembly is configured such that when the oral cleaning device is powered off the interface panel is blank, and when the oral cleaning device is powered on, at least one of the plurality of indicia on the panel corresponding to a selected oral cleaning device mode is illuminated.

2. The oral cleaning device of claim 1, wherein the cover portion is a thin film.

3. The oral cleaning device of claim 1, wherein the cover portion is a thermoplastic elastomer (TPE).

4. The oral cleaning device of claim 1, wherein the handle portion adjacent the user interface assembly is translucent.

5. The oral cleaning device of claim 1, wherein the interface panel comprises: a masking layer formed on an outer surface of the handle portion, the masking layer comprising one or more etched regions defining the plurality of indicia; and a light transmitting layer formed on the masking layer and etched regions.

6. The oral cleaning device of claim 5, wherein the interface panel further comprises a protective layer formed on the light transmitting layer.

7. The oral cleaning device of claim 1, wherein each of the plurality of illuminating elements comprises a plurality of intensities.

8. The oral cleaning device of claim 1, wherein the plurality of illuminating elements are LEDs.

9. An oral cleaning device, comprising:
a handle portion comprising a plurality of indicia and a plurality of illuminating elements;
a brush head member positioned at one end of the handle portion;
a mode select member; and
a user interface assembly, the user interface assembly comprising an interface panel and a baffle assembly, the baffle assembly comprising a plurality of baffle sections wherein each of the plurality of baffle sections corresponds with a respective one of the plurality of illuminating elements and a respective one of the plurality of indicia, and further wherein each of the plurality of baffle sections comprises a cover portion covering the baffle section and positioned between the respective one of the plurality of illuminating elements and the respective one of the plurality of indicia, and further wherein the cover portion comprises a material that allows light from the respective one of the plurality of illuminating elements to pass through and prevents diffusion of the light to adjacent baffle sections;
wherein the interface panel comprises: (i) a masking layer formed on an outer surface of the handle portion, the masking layer comprising one or more etched regions defining the plurality of indicia, and (ii) a light transmitting layer formed on the masking layer and etched regions;
wherein the handle portion adjacent the user interface assembly is translucent, and further wherein the user interface assembly is configured such that when the oral cleaning device is powered off the interface panel is blank, and when the oral cleaning device is powered on, at least one of the plurality of indicia on the panel corresponding to a selected oral cleaning device mode is illuminated.

10. The oral cleaning device of claim 9, wherein the interface panel further comprises a protective layer formed on the light transmitting layer.

11. A method for manufacturing an interface panel of an oral cleaning device, the method comprising the steps of:
inserting a baffle assembly inside a handle portion of the oral cleaning device, the handle portion comprising a plurality of indicia and a plurality of illuminating elements, the baffle assembly comprising a plurality of baffle sections, each of the plurality of baffle sections comprising a cover portion covering the baffle section and positioned between the respective one of the plurality of illuminating elements and the respective one of the plurality of indicia, and further wherein the cover portion comprises a material that allows light from the respective one of the plurality of illuminating elements to pass through and prevents diffusion of the light to adjacent baffle sections;
applying a masking layer on an outer surface of the handle portion;
etching at least a portion of the masking layer to create one or more etched regions defining the plurality of indicia; and
applying a light transmitting layer over the masking layer and etched regions.

12. The method of claim 11, further comprising the step of applying a protective layer on top of the second layer.

13. The method of claim 11, wherein the cover portion is a thin film.

14. The method of claim 11, wherein the cover portion is a thermoplastic elastomer (TPE).

15. The method of claim 11, wherein the handle portion adjacent the user interface assembly is translucent.

* * * * *